US012637040B1

(12) United States Patent
Bierwerth

(10) Patent No.: US 12,637,040 B1
(45) Date of Patent: May 26, 2026

(54) EMERGENCY BRAKING TRIGGER SYSTEM FOR A RAILCAR

(71) Applicant: Midwest Locomotive Services Inc., East Grand Forks, MN (US)

(72) Inventor: Jason Bierwerth, East Grand Forks, MN (US)

( * ) Notice: Subject to any disclaimer, the term of this patent is extended or adjusted under 35 U.S.C. 154(b) by 0 days.

(21) Appl. No.: 19/363,168

(22) Filed: Oct. 20, 2025

(51) Int. Cl.
B60T 8/17 (2006.01)
B60T 15/02 (2006.01)

(52) U.S. Cl.
CPC .......... B60T 8/1705 (2013.01); B60T 15/021 (2013.01); B60T 2240/00 (2013.01)

(58) Field of Classification Search
CPC ... B60T 8/1705; B60T 15/021; B60T 2240/00
See application file for complete search history.

(56) References Cited

U.S. PATENT DOCUMENTS

| | | | | |
|---|---|---|---|---|
| 6,237,877 | B1 * | 5/2001 | Wallace | ................. G01K 11/06 |
| | | | | 105/182.1 |
| 11,958,512 | B2 | 4/2024 | Haas et al. | |

| | | | | |
|---|---|---|---|---|
| 2002/0180264 | A1 * | 12/2002 | Moffitt | ................. B60T 13/665 |
| | | | | 303/128 |
| 2020/0189630 | A1 * | 6/2020 | Kernwein | ........... B61L 15/0054 |
| 2022/0119017 | A1 * | 4/2022 | Chiadini | ................ B61D 29/00 |
| 2024/0068593 | A1 * | 2/2024 | Hegedüs | ............... B60T 15/302 |
| 2024/0075911 | A1 * | 3/2024 | Dandoy | ................. B60T 7/128 |

FOREIGN PATENT DOCUMENTS

| | | |
|---|---|---|
| CN | 101734259 B | 6/2012 |
| CN | 111547099 B | 9/2021 |
| CN | 118669563 A | 9/2024 |

* cited by examiner

*Primary Examiner* — Toya Pettiegrew

(74) *Attorney, Agent, or Firm* — Fargo Patent & Business Law; Thomas Kading

(57) ABSTRACT

An emergency braking trigger system for a railcar includes an exhaust valve module mechanically coupled to a brake pipe of a railcar, a sensor suite operable to sense a threshold event of the railcar, and a control system in communication with the exhaust valve and the sensor, the control system operable to actuate the exhaust valve in response to the sensor, wherein activation comprises triggering an emergency braking function of the railcar.

15 Claims, 3 Drawing Sheets

EMERGENCY BRAKING TRIGGER SYSTEM FOR A RAILCAR

CROSS REFERENCE TO RELATED APPLICATION[S]

None

BACKGROUND

The present disclosure relates to railcars, and more specifically to an emergency braking trigger system therefor.

The vast majority of trains are equipped with braking systems which use compressed air as the motive force. These systems are known as "air brakes" or "pneumatic brakes". The compressed air is transmitted along the train through a "brake pipe" or, in North America, a "train line". Changing the level of air pressure in the pipe causes a change in the state of the brake on each vehicle. Traditional pneumatic brake system on railcars trigger emergency braking when the brake pipe is physically broken-typically after a railcar has fully derailed or disconnected.

This background section is intended to introduce the reader to various aspects of art that may be related to various aspects of the present disclosure, which are described and/or claimed below. This discussion is believed to assist the reader with background information to facilitate a better understanding of the various aspects of the present disclosure. Accordingly, it should be understood that these statements are to be read in this light, and not as admissions of prior art.

SUMMARY

An emergency braking trigger system for a railcar according to one disclosed non-limiting embodiment of the present disclosure includes an exhaust valve module mechanically coupled to a brake pipe of a railcar; a sensor suite operable to sense a threshold event of the railcar; and a control system in communication with the exhaust valve and the sensor, the control system operable to actuate the exhaust valve in response to the sensor, wherein activation comprises triggering an emergency braking function of the railcar.

A further embodiment of any of the foregoing embodiments of the present disclosure includes that triggering the emergency braking function of the railcar comprises venting of air from the brake pipe through the exhaust valve.

A further embodiment of any of the foregoing embodiments of the present disclosure includes that the exhaust valve module comprises an exhaust valve coupled to the brake pipe of the railcar, a power source to power the exhaust valve, and a wireless control in wireless communication with the control system.

A further embodiment of any of the foregoing embodiments of the present disclosure includes that the exhaust valve is mechanically coupled to the brake pipe via an aperture drilled into the brake pipe.

A further embodiment of any of the foregoing embodiments of the present disclosure includes that the exhaust valve is electromagnetically actuated to vent air from the brake pipe.

A further embodiment of any of the foregoing embodiments of the present disclosure includes that the brake pipe is in communication with the emergency braking function of the railcar.

A further embodiment of any of the foregoing embodiments of the present disclosure includes that the sensor suite is in wireless communication with the control system.

A further embodiment of any of the foregoing embodiments of the present disclosure includes that the sensor suite comprises a sensor mounted to each bearing point on the railcar.

A further embodiment of any of the foregoing embodiments of the present disclosure includes that the sensor suite comprises a sensor mounted to each of 8 bearing points on a 4-axle railcar.

A further embodiment of any of the foregoing embodiments of the present disclosure includes that at least one sensor of the sensor suite comprises a temperature sensor.

A further embodiment of any of the foregoing embodiments of the present disclosure includes that at least one sensor of the sensor suite comprises an accelerometer.

A further embodiment of any of the foregoing embodiments of the present disclosure includes that each sensor is mounted on a side-frame at a pedestal key location.

A further embodiment of any of the foregoing embodiments of the present disclosure includes that the control system comprises a data hub in communication with the sensor suite and the control system, the data hub magnetically attached to the railcar.

A method of triggering an emergency braking system for a railcar according to one disclosed non-limiting embodiment of the present disclosure includes continuously monitoring sensor data from the railcar; identifying an unsafe condition from a sensor suite; and triggering an exhaust valve module mechanically coupled to a brake pipe of a railcar to vent air from the brake pipe in response to the identifying.

A further embodiment of any of the foregoing embodiments of the present disclosure includes venting air from the brake pipe results in actuation of an emergency braking mode.

A further embodiment of any of the foregoing embodiments of the present disclosure includes triggering the exhaust valve module comprises venting the brake pipe of the railcar by electromagnetically actuating the exhaust valve.

A further embodiment of any of the foregoing embodiments of the present disclosure includes powering the exhaust valve via a battery.

A further embodiment of any of the foregoing embodiments of the present disclosure includes wirelessly communicating with the exhaust valve and the sensor suite.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
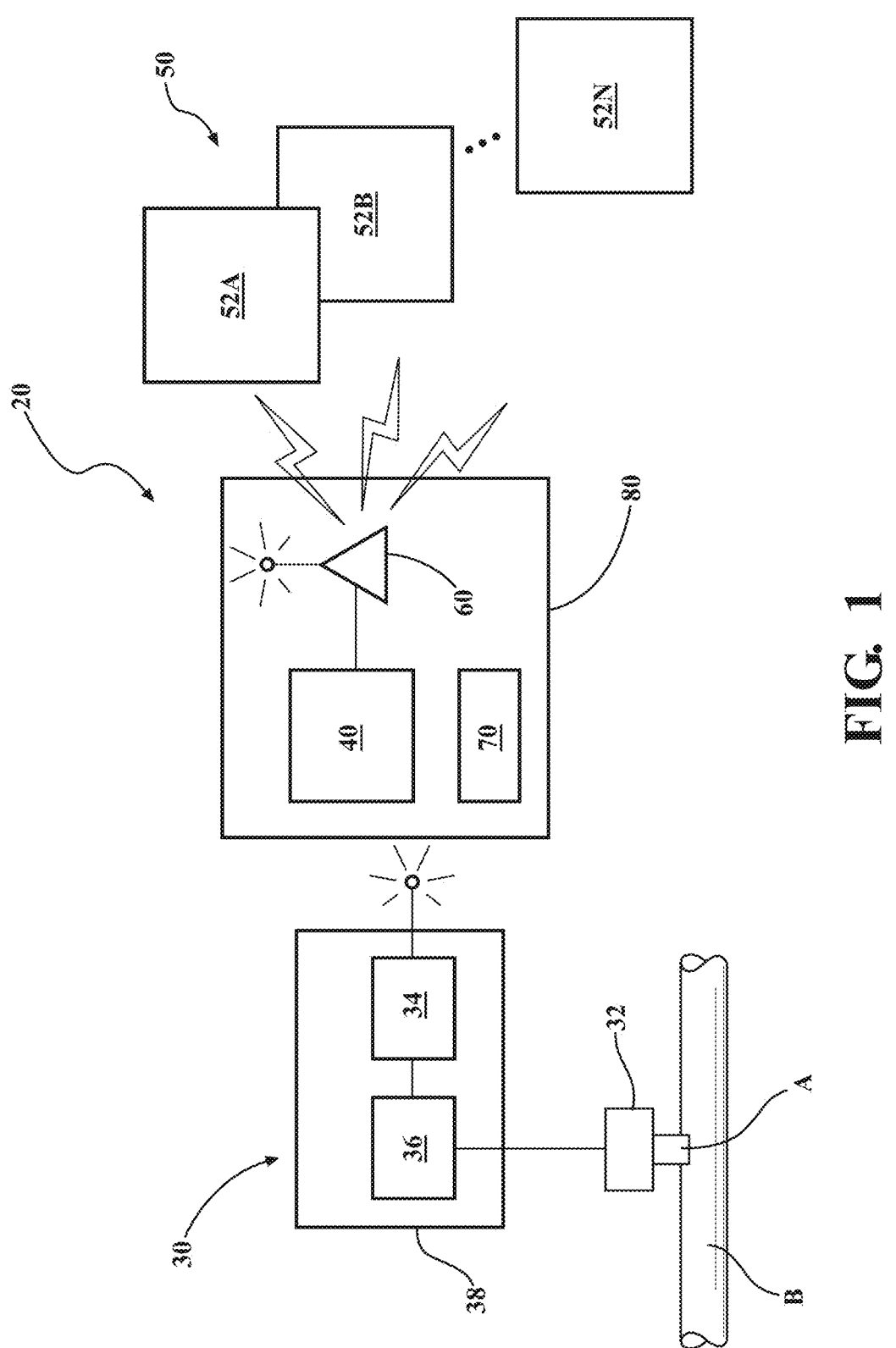
FIG. 1 is a schematic view of an emergency braking trigger system according to one disclosed non-limiting embodiment.

FIG. 1 schematically illustrates an emergency braking trigger system 20 which can be mounted to an emergency braking system B of a railcar R to provide an autonomous, wireless, and retrofittable safety solution which autonomously and proactively places the railcar R into an emergency mode.

Typically, air is compressed then stored in in a main reservoir at 7-10 bar (100-140 lbs/sq.in). Compressed air from the main reservoir is distributed along the train through the main reservoir pipe. On each railcar R, the pipe may be connected through a triple valve to an auxiliary reservoir which stores air for use on that railcar R brake system. The flow of air between the auxiliary reservoir and the brake cylinders is controlled through a triple valve or distributor. The control of the distributor is achieved by varying the pressure in a second pipe called the brake pipe, which is connected to a brake valve in the driver's cab. Increasing the pressure in the brake pipe causes the brakes to release, while decreasing the pressure causes the brakes to apply.

The emergency braking trigger system 20 generally includes an exhaust valve module 30, a control system 40, and a sensor suite 50 which are in wireless communication. The emergency braking trigger system 20 provides for a standalone and wireless system that requires no integration into the central control or power systems of the train.

Figure 2:
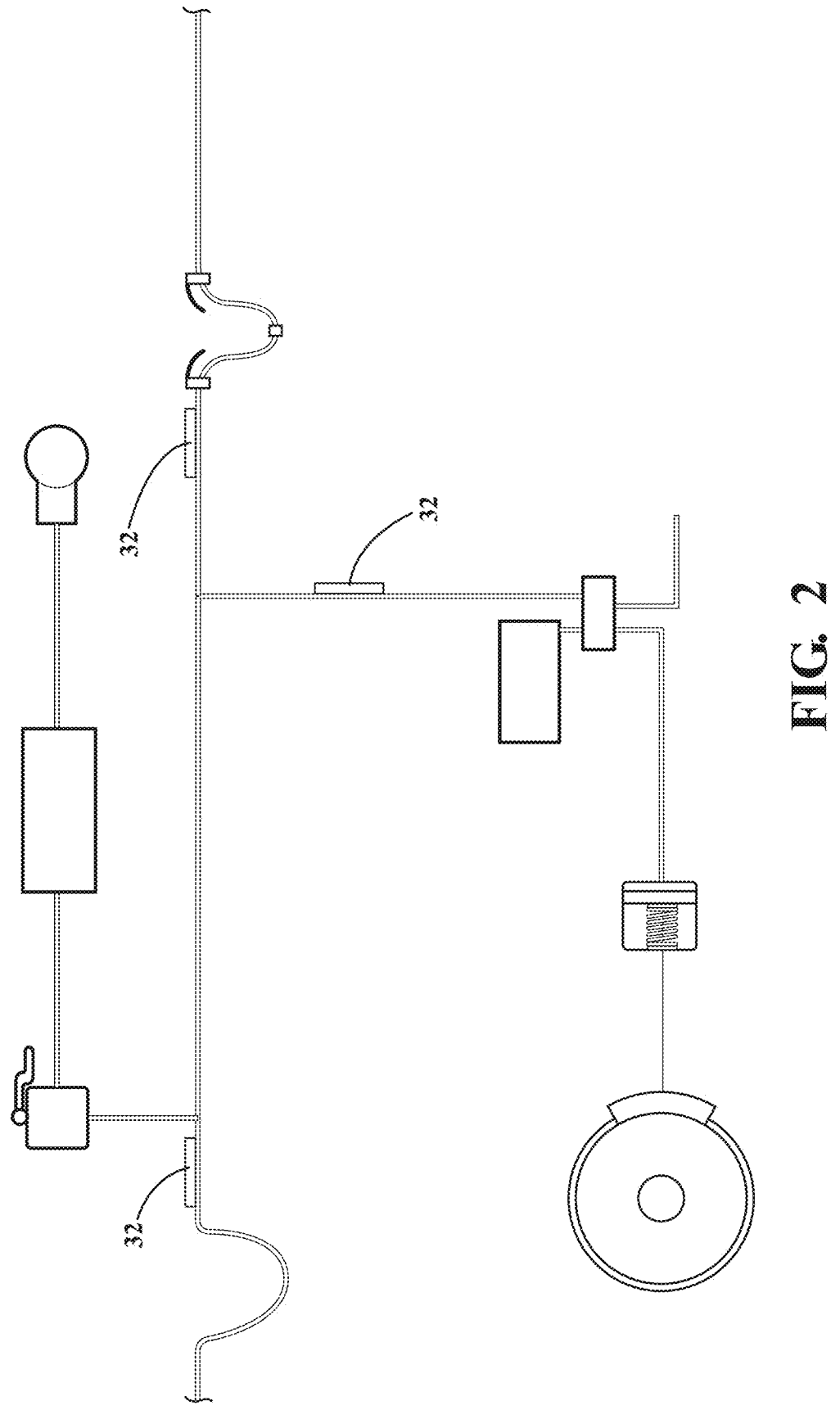
FIG. 2 is a schematic view of example exhaust valve module mounting locations on a railcar.
Figure 3:
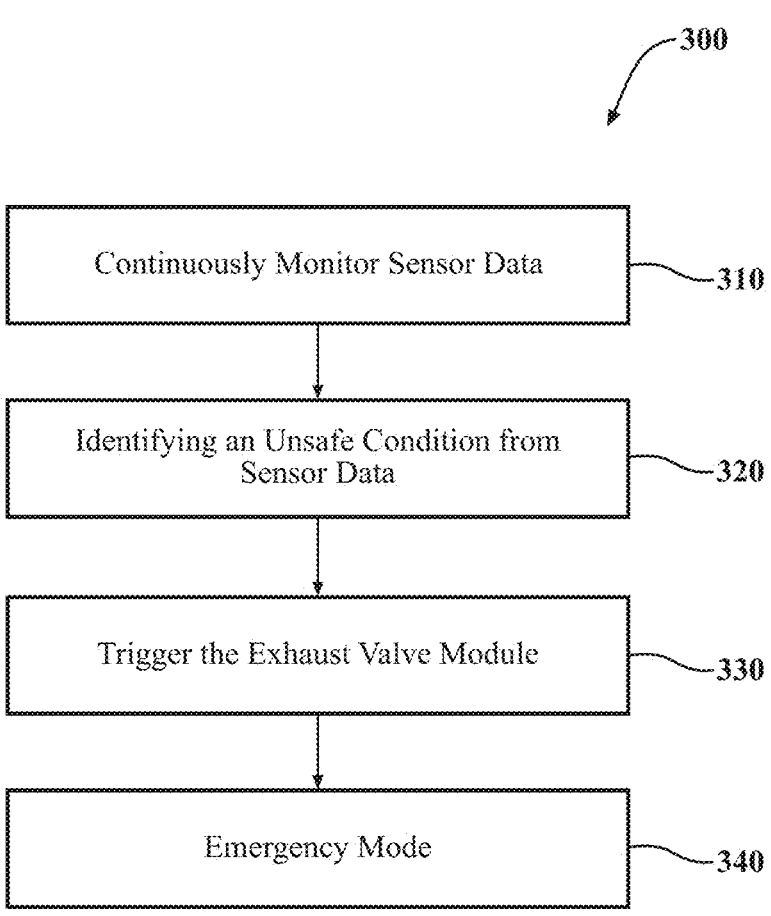
FIG. 3 is a block diagram for an operational use case of the emergency braking trigger system according to one disclosed non-limiting embodiment.

The exhaust valve module 30 may generally include an exhaust valve 32, a wireless control 34 and a power source 36, such as a battery to provide a self-contained, wireless, exhaust valve that may be readily mechanically coupled to a brake pipe B of a railcar R at various locations (example locations shown in FIG. 2) to exhaust he air pressure so that the air brakes are activated. In embodiments, the exhaust valve module 30 may be installed directly on a brake pipe B of each truck assembly T of each railcar R, for example, on the service portion of the brake pipe under the railcar R body. In one example, an electro-magnetically operable exhaust valve may be a solenoid-actuated electromagnet valve such as that manufactured by SMC Corporation of America of Noblesville IN, U.S.A.

The exhaust valve 32 may be mechanically coupled to the brake pipe B via an aperture A such as a one-inch (1 in.) aperture drilled into the brake pipe B such that the electro-magnetically operable exhaust valve 30 may be mounted directly thereto via welding, clamps, etc. so as to provide air pressure release therefrom. The exhaust valve 32 can be mounted on the B-End of the railcar or A-End and connected with a flexible hose to the trainline.

The wireless control 34 may include a wireless ISM band interface and protocol to include, for example, Bluetooth Low Energy (BLE), LoRa (Long Range), LoRaWAN (Long Range Wide Area Network) type networking protocol which provides for wireless communication with the control system 40. The wireless control 34 and the power source 36 may be contained within an enclosure 38 so as to facilitate convenient weatherproof standalone and wireless installation at various locations adjacent to or displaced from the exhaust valve 32 itself which may be mounted to the brake pipe B.

The control system 40 may include at least one processor, e.g., microprocessor, microcontroller system, digital signal processor, etc., a memory, and an input/output (I/O) interface. The processor and the I/O interface are communicatively coupled to the memory. The memory may be embodied as various forms of ROM, RAM, which stores data and control algorithms such as the logic described herein to control, for example the exhaust valve 32 in response to the sensor suite 50. The I/O interface is communicatively coupled to a number of hardware, firmware, and/or software components, including, for example, the power source 36, a data hub 60, etc. The control system 40 may be in communication with the sensor suite 50 via the data hub 60 such as a wireless ISM band interface and protocol to include, for example, Bluetooth Low Energy (BLE), LoRa (Long Range), LoRaWAN (Long Range Wide Area Network) type networking protocol.

The data hub 60, for example, a solar-powered data hub maybe mounted on the railcar R, such as magnetically on either the A-End or B-End of the railcar R to provides real time communication between the control system 40, the sensor suite 50 and each exhaust valve module 30. That is, the sensor suite 50 transmits real-time data wirelessly to the control system 40 via the data hub 60 to control the exhaust valve module 30. The control system 40, the data hub 60, and a power source 70 such as a battery, may be contained within an enclosure 80 so as to facilitate weatherproof standalone and wireless installation at various locations In embodiments, the sensor suite 50 may include one or more sensors 52A, 52B, . . . 52n located on the railcar R. The one or more sensors 52A, 52B, . . . 52n, may include, for example, an accelerometer, gyroscopes (tilt, angle change, vibration, etc.) light sensors, sound sensors, pressure sensors, temperature sensors, etc., that may continuously monitor metrics such as vibration, tilt, wheel bearing temperature, impact forces, etc. The one or more sensors 52A, 52B, . . . 52n, may be located, for example, on each axle bearing (8 bearing points (on a 4-axle railcar)) of the railcar R. In one example, one or more sensors 52A, 52B, . . . 52n may be mounted on the side-frame at the pedestal key location. The side-frame key adapters may need to be removed prior to installation. A side-frame pedestal key adapter may be a version of the traditional bearing adapter which interfaces with a "side-frame key," a specialized retaining pin that locks the wheelset in place. A railcar side-frame key, or pedestal key, is a forged steel component that locks the roller bearing wheelset into the pedestal of a railcar's side-frame to retain the axle and wheel assembly within the side-frame, preventing the wheelset from becoming dislodged, especially during severe train movements or derailments. This keeper mechanism facilitates retention when the weight distribution shifts, and the wheels oscillate.

A sensor may be installed on one or more of the eight points on a four-axle railcar. The one or more sensors 52A, 52B, . . . 52n, may be independently powered by a power source such as a battery, and wirelessly communicate with the control system 40 via the data hub 60. The sensor suite 50 may include third-party sensors already installed on the railcar R.

With reference to FIG. 4 a method 300 for operating the emergency braking trigger system 20 is schematically illustrated. The functions may be programmed software routines capable of execution in various microprocessor-based electronics control embodiments and are represented herein as block diagrams.

Under normal operating conditions, the control system 40 continuously monitors (310) incoming wireless signals from the data hub 60 which is in communication with the sensor suite 50. When the control system 40 identifies an unsafe condition (320) from, the sensor suite 50, for example excessive vibration, high temperature, sudden impact, or abnormal tilt which exceeds predetermined limit, the control system 40 triggers (330) the exhaust valve module 30. The exhaust valve 32 is thereby opened which vents air from the brake pipe B to cause the railcar R air brakes to activate, placing the car into emergency mode (340). This immediate response reduces the likelihood of further derailment, protects nearby railcars, and reduces the distance and destruction typically seen with current systems that only respond after physical brake pipe separation.

The emergency braking trigger system 20 is modular, self-powered, and designed for aftermarket installation on existing freight railcars, offering a scalable safety solution for early derailment response without overhauling the trainline architecture. The emergency braking trigger system 20 operates on real-time data from onboard sensors mounted near each wheel bearing to detect derailment-related events and autonomously trigger emergency braking by exhausting the brake pipe. The emergency braking trigger system 20 proactively monitors for early signs of derailment (vibration, impact, angle changes) and triggers emergency braking in real time which improves crew and cargo safety, and minimizing service disruptions.

The emergency braking trigger system 20 provides for retrofit installation with minimal disruption to existing railcar systems. No wiring to the locomotive or trainline is required. The modular nature of the system allows it to be installed on select railcars across a fleet as needed.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. An emergency braking trigger system for a railcar, comprising:
   an exhaust valve mounted to a brake pipe of a railcar via an aperture drilled into the brake pipe;
   a first enclosure magnetically attachable to the railcar;
   a wireless control to control the exhaust valve, the wireless control within the first enclosure;
   a power source to power the exhaust valve and the wireless control, the power source within the first enclosure;
   a sensor suite operable to sense a threshold event of the railcar;
   a second enclosure magnetically attachable to the railcar;
   a data hub in wireless communication with the sensor suite, the data hub within the second enclosure;
   a power source to power the data hub and the control system, the power source within the second enclosure; and a control system within the second enclosure, the control system in wireless communication with the wireless control to actuate the exhaust valve in response to the sensor suite, wherein activation comprises triggering an emergency braking function of the railcar via opening the exhaust valve which vents air from the brake pipe through the exhaust valve to cause the railcar air brakes to activate, placing the railcar into emergency mode.

2. The system as recited in claim 1, wherein the exhaust valve is electromagnetically actuated to vent air from the brake pipe.

3. The system as recited in claim 2, wherein the brake pipe is in communication with the emergency braking function of the railcar.

4. The system as recited in claim 1, wherein the sensor suite comprises a sensor mounted to each bearing point on the railcar.

5. The system as recited in claim 4, wherein the sensor suite comprises a sensor mounted to each of 8 bearing points on a 4-axle railcar.

6. The system as recited in claim 5, wherein at least one sensor of the sensor suite comprises a temperature sensor.

7. The system as recited in claim 5, wherein at least one sensor of the sensor suite comprises an accelerometer.

8. The system as recited in claim 5, wherein each sensor is mounted on a sideframe at a pedestal key location.

9. A method of triggering an emergency braking system for a railcar, comprising:
   magnetically attaching a first enclosure to the railcar, the first enclosure containing a wireless control and a power source to electromagnetically actuate an exhaust valve mounted to a brake pipe of a railcar to selectively vent air from the brake pipe resulting in actuation of an emergency braking mode;
   magnetically attaching a second enclosure to the railcar, the second enclosure containing a data hub, a power source and a control system, the data hub in wireless communication with the wireless control in the first enclosure and a sensor suite, the power source operable to power the data hub, and the control system, continuously monitoring sensor data from the sensor suite on the railcar with the control system;
   identifying an unsafe condition from the sensor suite with the control system;
   communicating from the control system to the wireless control via the data hub in response to the identifying; and
   triggering the exhaust valve with the wireless control.

10. The method as recited in claim 9, wherein triggering the exhaust valve comprises electromagnetically actuating the exhaust valve.

11. The method as recited in claim 9, wherein communicating from the control system to the wireless control via the data hub comprises wirelessly communicating.

12. The system as recited in claim 1, wherein the activation comprises triggering the emergency braking function of the railcar independently of locomotive commands, trainline signaling, and electronically controlled pneumatic brake systems.

13. The method as recited in claim 9, wherein triggering the exhaust valve comprises triggering the emergency braking function of the railcar independently of locomotive commands, trainline signaling, and electronically controlled pneumatic brake systems.

14. The method as recited in claim 9, further comprising mounting a sensor of the sensor suite to each bearing point on the railcar.

15. The method as recited in claim 9, further comprising mounting a sensor of the sensor suite to each of 8 bearing points on a 4-axle railcar.

* * * * *